United States Patent
Thomas

(10) Patent No.: US 7,243,202 B2
(45) Date of Patent: Jul. 10, 2007

(54) SEARCHING FOR PACKET IDENTIFIERS

(75) Inventor: Tom Thomas, Bristol (GB)

(73) Assignee: STMicroelectronics Limited, Bristol (GB)

(*) Notice: Subject to any disclaimer, the term of this patent is extended or adjusted under 35 U.S.C. 154(b) by 1021 days.

(21) Appl. No.: 10/107,602

(22) Filed: Mar. 27, 2002

(65) Prior Publication Data

US 2002/0154636 A1    Oct. 24, 2002

(30) Foreign Application Priority Data

Mar. 27, 2001   (EP)   .................................. 01302827

(51) Int. Cl.
*G06F 12/06*   (2006.01)
*H04L 29/06*   (2006.01)
(52) U.S. Cl. ...................................... 711/169; 370/394
(58) Field of Classification Search ................ 370/392, 370/412, 394; 711/169, 167, 156, 145
See application file for complete search history.

(56) References Cited

U.S. PATENT DOCUMENTS

| | | | | |
|---|---|---|---|---|
| 4,628,532 A * | 12/1986 | Stone et al. | ................ | 382/197 |
| 5,898,784 A | 4/1999 | Kirby et al. | .................... | 380/49 |
| 2002/0087756 A1 * | 7/2002 | Maessen | ....................... | 710/52 |
| 2002/0136219 A1 * | 9/2002 | Ding et al. | .................. | 370/394 |
| 2002/0164022 A1 * | 11/2002 | Strasser et al. | ............. | 380/201 |
| 2003/0046423 A1 * | 3/2003 | Narad et al. | ................. | 709/238 |
| 2003/0095536 A1 * | 5/2003 | Hu et al. | ..................... | 370/394 |

FOREIGN PATENT DOCUMENTS

| EP | 430482 A | * | 11/1989 |
|---|---|---|---|
| EP | 1246424 A | * | 10/2002 |
| WO | WO/0077984 | | 12/2000 |

OTHER PUBLICATIONS

Wu et al., "AGREP—A Fast Approximate Pattern-Matching Tool", Proceedings of the Winter 1992 USENIX Conference, San Francisco, California, Jan. 20-24, 1992, pp. 153-162.*
Montgomery, W.A., "Techniques for Packet Voice Synchronisation", IEEE Journal on Selected Areas in Communications, vol. SAC-1, No. 6, Dec. 1983, pp. 1022-1028.*

* cited by examiner

*Primary Examiner*—Pierre-Michel Bataille
(74) *Attorney, Agent, or Firm*—Lisa K. Jorgenson; Robert Iannucci; Seed IP Law Group PLLC

(57) ABSTRACT

A method of locating packet identifiers held in respective memory locations in a memory, the method comprising receiving a plurality of packets, each packet including a packet identifier, searching said memory locations in a sequence to compare an incoming packet identifier with packet identifiers stored in the memory until a match is found, incrementing one of a set of counters associated respectively with the memory locations, said incremented counter being the one associated with the memory location where the match packet identifier is held, and reading values of each of the counters and using said values to determine the sequence in which the memory locations are searched for subsequent incoming packet identifiers.

16 Claims, 3 Drawing Sheets

SEARCHING FOR PACKET IDENTIFIERS

BACKGROUND OF THE INVENTION

1. Field of the Invention

The present invention relates to searching for packet identifiers, and is particularly but not exclusively concerned with the location of appropriate packet identifiers and their corresponding keys for encryption/decryption of transport stream packet payloads in a digital video bit stream.

2. Description of the Related Art

In a digital video bit stream, packets carry encrypted payloads. To construct a packet, a payload is encrypted using an encryption key, information about which is encoded by the packet identifier. The decryption key which can be used to decrypt the encrypted payload when the packet is received is thus identified in the packet identifier of the packet. In order to establish encryption/decryption keys, each packet identifier is interrogated and memory locations of a memory holding a plurality of packet identifiers are scanned sequentially until a match is found. Once a matching packet identifier has been located, the corresponding encryption/decryption key can be retrieved by a simple transformation of the address of the memory location holding that packet identifier.

Currently, memory locations are scanned in order of memory address, from the first memory address to the last memory address. If an incoming packet identifier happens to have a match at the last memory location to be scanned, obviously the total time to extract the right encryption/decryption key is longer than if the packet identifier was at the first memory location. Currently, the order of packet identifiers in a memory is either random or, if the software has prior knowledge of the frequency of certain packet identifiers in the transport stream, the packet identifiers may be ordered in memory such that the most frequently occurring is placed at the first memory address, and the least frequently occurring at the last address, with a grading in between.

In current systems, the number of packet identifiers which are normally stored means that in fact there is not a large overhead in carrying out the search for packet identifiers, regardless of the order in which the memory locations are scanned. However, as the requirement grows for a greater number of packet identifiers/encryption/decryption keys to be stored, the packet identifier search time will become more significant as a proportion of total processing time. Also, in all cases of typical transport streams, some PIDs occur many more time than others.

BRIEF SUMMARY OF THE INVENTION

An embodiment of the present invention provides for an improvement in the search time for packet identifiers.

The present invention provides in one aspect a method of locating packet identifiers held in respective memory locations in a memory, the method comprising: receiving a plurality of packets, each packet comprising a packet identifier; searching said memory locations in a sequence to compare an incoming packet identifier with packet identifiers stored in the memory until a match is found; incrementing one of a set of counters associated respectively with the memory locations, said incremented counter being the one associated with the memory location where the matched packet identifier is held; and reading values of each of the counters and using said values to determine the sequence in which the memory locations are searched for subsequent incoming packet identifiers.

In the preferred embodiment, memory locations are read from the highest value of the memory address space first.

The method of locating packet identifiers is particularly useful when each packet identifier is associated with a decryption key which can be used to decrypt the encrypted payload for that packet.

To avoid the problem of overflow, the method can comprise the step of decrementing each counter at predetermined time intervals. For example, appropriate time intervals might be 1 µs, 100 µs, 1 ms. The frequency of the time intervals can be fully programmable.

A further aspect of the invention provides a method of locating decryption keys for decrypting encrypted payloads in a packet stream wherein each packet comprises at least a packet identifier associated with said decryption key for that packet, the method comprising; receiving a sequence of said packets, searching a set of memory locations in a sequence to compare an incoming packet identifier with packet identifiers stored in the memory locations until a match is found, incrementing one of a set of counters associated respectively with the memory locations, said incremented counter being the one associated with the memory location where the matched packet identifier is held; using the matched packet identifier to locate the decryption key for that packet; reading values of each of the counters and using said values to determine the sequence in which the memory locations are searched for subsequent incoming packet identifiers.

In particular, an embodiment the invention provides a method of encrypting/decrypting transport stream packet payloads using the method of locating encryption/decryption keys as defined above.

The invention further provides a system for locating packet identifiers held in respective memory locations in a memory, the system comprising: an address generator for generating memory addresses to address said memory locations in a sequence thereby to recall packet identifiers stored in the memory; a packet identifier matcher which compares packet identifiers recalled from the memory with an incoming packet identifier until a match is found; a set of counters associated respectively with the memory locations; means for incrementing said counters, whereby the counter associated with the memory location for each matched packet identifier is incremented; and wherein the address generator is operable to read values of each of the counters and to use said values to determine the sequence in which the memory locations are searched for a match with subsequent incoming packet identifiers.

For a better understanding of the present invention and to show how the same may be carried into effect, reference will now be made by way of example to the accompanying drawings.

DETAILED DESCRIPTION OF THE INVENTION

Figure 1:
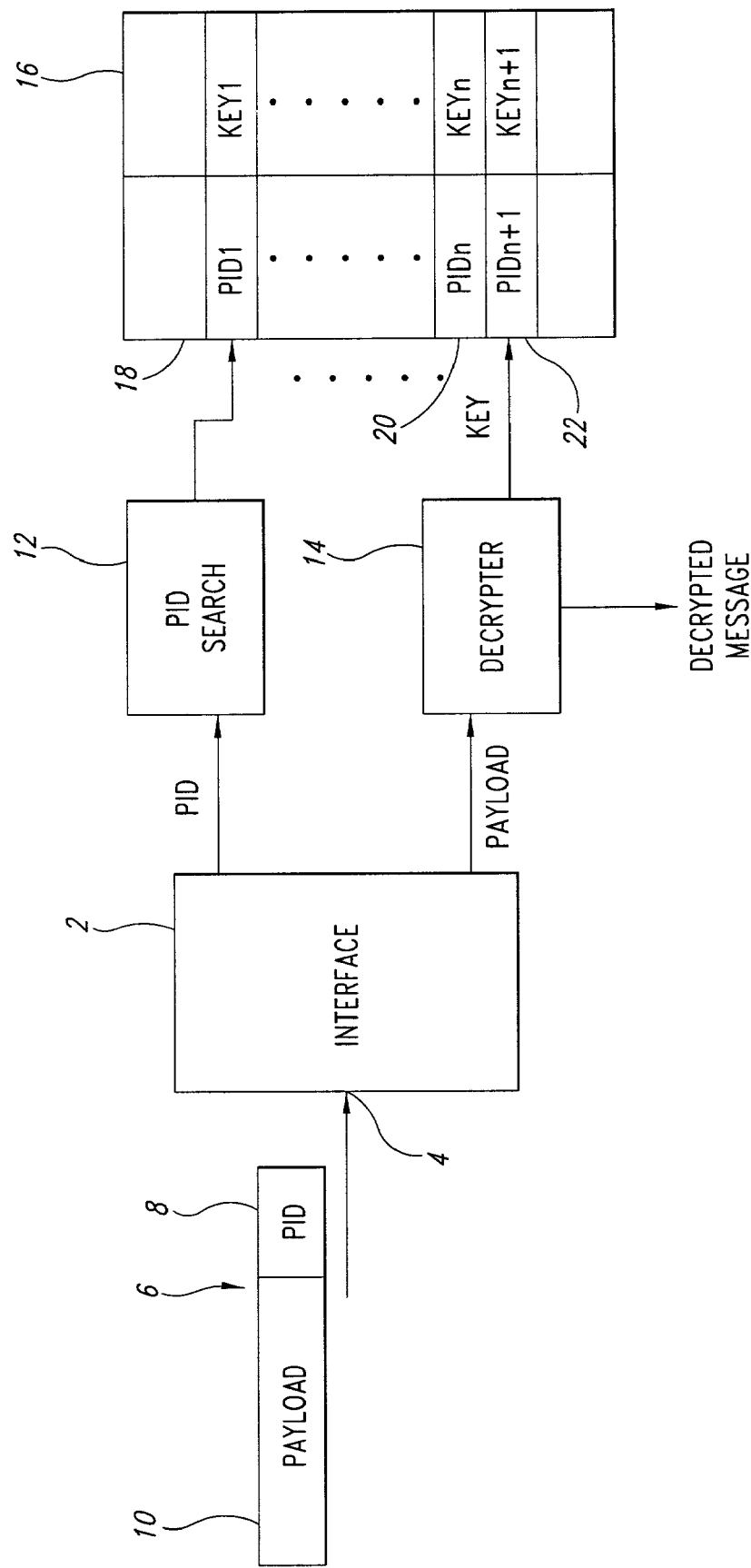
FIG. 1 is a schematic block diagram illustrating the context of the invention.

Reference is first made to FIG. 1 to illustrate the context of the invention. FIG. 1 illustrates a schematic diagram of a message receiving and decrypting device. The device comprises a message receiving interface 2 which has an input 4 for receiving packets of the type denoted by numeral 6. Each packet comprises a packet identifier PID 8 and the payload portion 10. The payload portion 10 is encrypted according to a key which can be identified through the packet identifier as discussed more fully herein. The interface 2 supplies the packet identifier 8 to a packet identifier search engine 12. It supplies the payload portion 10 to a decryptor 14. The device includes a memory 16 which holds packet identifiers PID in association with respective keys KEY. It will be appreciated that the diagram is schematic only. In fact, the corresponding key for each packet identifier PID can be retrieved by simple transformation of the address in the memory 16 which holds the particular packet identifier PID. This is known in the art and will not be described further herein.

On receipt of a message packet 6, the PID search engine 12 is used to scan memory locations, e.g. 18, 20 and 22. Memory locations are scanned until a match is obtained with the packet identifier portion 8 of the incoming packet 6 to a PID stored in one of the memory locations. Upon the event of a match, a corresponding key is retrieved by a transformation of the PID address, and the key is supplied to the decryptor 14. The decryptor 14 can then operate to decrypt the payload portion 10 of the incoming packet to output a decrypted message.

Figure 2:
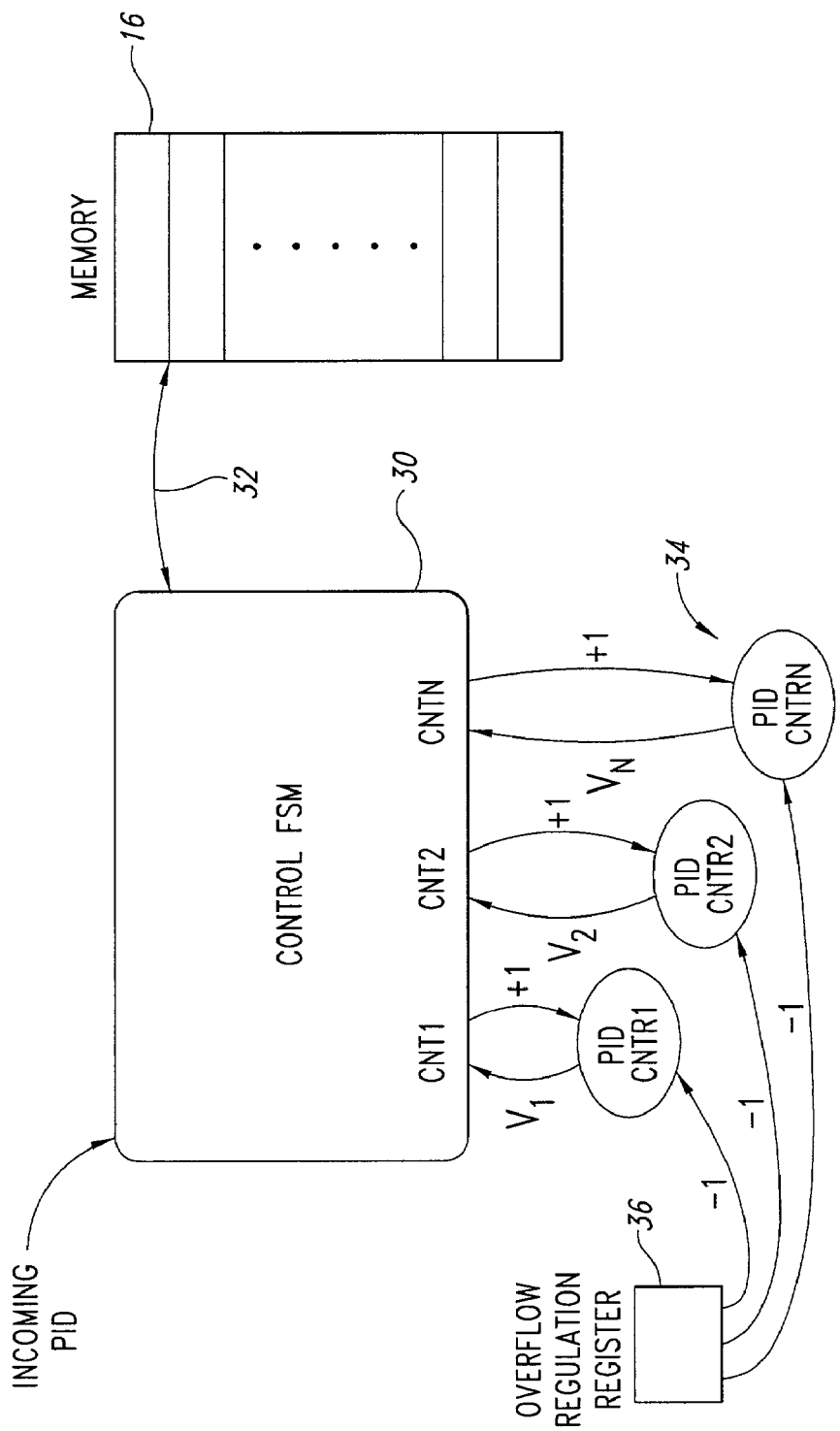
FIG. 2 illustrates in state machine format a preferred embodiment of the present invention.

FIG. 2 illustrates a PID search engine 12 in accordance with one embodiment of the invention. A hardware function FSM 30 is used to access the memory 16 along memory access path 32. Although not shown in FIG. 2, it will be appreciated that the memory access path 32 comprises an address bus 32b for supplying addresses to the memory 16 and a data bus 32a for returning data (in the form of PIDs) from the memory 16 to the control FSM 30. The control FSM 30 is associated with a set of counters 34 labelled PID cntr1, PID cntr2 . . . PID cntrN, each counter representing one of N PID addresses identifying memory locations in the memory 16. Each counter initially starts with a tally of zero. When the first incoming packet identifier PID is received, a search is carried out through the memory 16 comparing that packet identifier with the contents of each memory location in order. When a match is located, the value of the counter PID cntr in the set of counters 34 associated with the matched memory address is incremented by one. Before the search for the next incoming packet identifier PID, values from each of the counters, labelled V1, V2 . . . Vn are returned to the control FSM 30. At the start of the next search, the address in the memory 16 associated with the highest counter value is scanned first, followed by the next highest value and continues in succession of highest to lowest counter value. This means that, over a long period of time, an optimal search order related to the frequency of occurrence of packet identifiers in the incoming packet stream is approached, which becomes more refined with time.

Clearly, the scheme will operate for a short time, that is until the counters overflow. If the counters overflow, the search scheme could go wrong. To prevent this, a software programmable register 36 is provided which decrements by one the total in each counter at predetermined time periods. For example, the time periods for decrementing the counters is programmable, for example 7 μs, 100 μs, 1 ms. However, the time periods may be increased or decrease as required by the design application.

Figure 3:
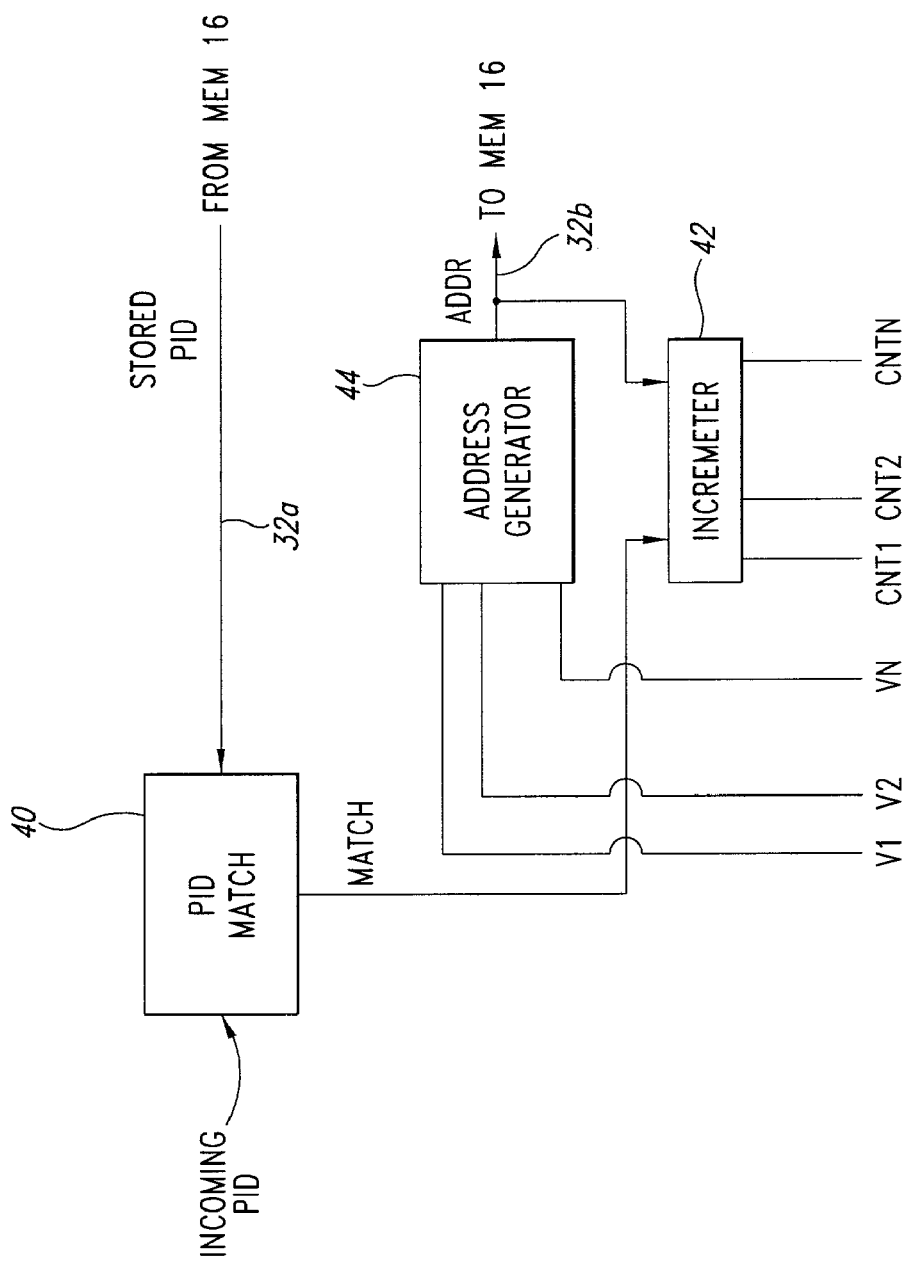
FIG. 3 is a functional block diagram of an embodiment of the invention.

FIG. 3 illustrates in schematic form functional blocks for the control FSM 30. A packet identifier match block 40 receives incoming packet identifiers from the packet stream, and packet identifiers from the memory 16 on the data bus 32a. When a match is located, PID match block 40 transmits a match signal to an incrementer 42. An address generator 44 generates addresses which are dispatched to the memory 16 along address bus 32b. When a match is located by the PID match block 40, the address which was supplied to the memory to achieve that match is supplied to the incrementer 42 along with the match signal. The incrementer 42 generates the increment signals cnt1, cnt2 . . . cntN to the respective counters in the set of counters 34.

The address generator 44 receives the incoming values V1, V2 . . . VN from the counters and uses those values to determine its search strategy by generating addresses in the order of the highest value of a counter in the set of counters first.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A system for locating packet identifiers held in respective memory locations in a memory, the system comprising:
    an address generator for generating memory addresses to address said memory locations in a sequence thereby to recall packet identifiers stored in the memory;
    a packet identifier matcher which compares packet identifiers recalled from the memory with an incoming packet identifier until a match is found;
    a set of counters associated respectively with the memory locations;
    means for incrementing said counters, whereby the counter associated with the memory location for each matched packet identifier is incremented; and
    wherein the address generator is operable to read values of each of the counters and to use said values to determine the sequence in which the memory locations are searched for subsequent incoming packet identifiers.

2. A system according to claim 1, which comprises a decrementer for decrementing each of said set of counters by one at predetermined time intervals.

3. A system according to claim 1, wherein the memory holds said packet identifiers in association with respective decryption keys.

4. A method of locating packet identifiers held in respective memory locations in a memory, the method comprising:
    receiving a plurality of packets, each packet including a packet identifier;
    searching said memory locations in a sequence to compare an incoming packet identifier with packet identifiers stored in the memory until a match is found;
    incrementing one of a set of counters associated respectively with the memory locations, said incremented counter being the one associated with the memory location where the match packet identifier is held; and
    reading values of each of the counters and using said values to determine the sequence in which the memory locations are searched for subsequent incoming packet identifiers.

5. A method according to claim 4, wherein said values are used to determine the sequence in which the memory locations are searched by reading memory locations associated with the highest value first, and then reading subsequent memory locations in order of decreasing values.

6. A method according to claim 4, wherein each packet includes an encrypted payload, and each packet identifier is associated with a respective decryption key usable to decrypt the encrypted payload.

7. A method according to claim 4, wherein each counter is decremented by one at predetermined time intervals.

8. A method of locating decryption keys for decrypting encrypted payloads in a packet stream wherein each packet includes at least a packet identifier associated with said decryption key for that packet, the method comprising:
receiving a sequence of said packets;
searching a set of memory locations in a sequence to compare an incoming packet identifier with packet identifiers stored in the memory locations until a match is found;
incrementing one of a set of counters associated respectively with the memory locations, said incremented counter being the one associated with the memory location where the matched packet identifier is held;
using the matched packet identifier to locate the decryption key for that packet; and
reading values of each of the counters and using said values to determine the sequence in which the memory locations are searched for subsequent incoming packet identifiers.

9. A method of decrypting packet payloads, the method comprising locating the decryption key for a packet according to the method of claim 8, and using the located decryption key to decrypt the payload of the packet.

10. A method of matching packet identifiers comprising the steps of:
receiving a input packet stream wherein each packet contains an input packet identifier and a payload;
searching in a sequence a plurality of locations in a memory, wherein each location stores a packet identifier, to find a matching memory location that stores a matching input packet identifier that matches;
upon finding matching memory location, incrementing a selected counter of a plurality of counters wherein the selected counter is associated with the matching memory location;
selecting an order of the sequence of the locations in the memory based on values contained in the counters of the plurality of counters; and
searching the plurality of locations in the memory according to the selected order of the sequence.

11. The method of matching according to claim 10, wherein the step of selecting the sequence further comprises the step of incrementing the value contained in the selected counter.

12. The method of matching according to claim 10, further comprising associating a decryption with the matching memory location.

13. The method of matching according to claim 10, wherein at a predetermined time interval, decrementing the values of the counters.

14. The method of matching according to claim 10, wherein the selected sequence is a descending order beginning at a highest value stored in one of the counters to a lowest value stored in one of the counters.

15. The method of matching according to claim 10, wherein the selected sequence is an ascending order beginning at a lowest value stored in one of counters to a highest value stored in one of the counters.

16. The method of matching according to claim 10, further comprising determining an associated key associated with the matching memory location, upon finding the matching memory location.

\* \* \* \* \*